United States Patent
Ono et al.

(10) Patent No.: US 10,808,784 B2
(45) Date of Patent: Oct. 20, 2020

(54) COIL SPRING

(71) Applicant: NHK Spring Co., Ltd., Yokohama-shi (JP)

(72) Inventors: Yoshiki Ono, Yokohama (JP);
Kazuhiko Konomi, Yokohama (JP);
Takamichi Sano, Yokohama (JP);
Masaru Imamura, Yokohama (JP);
Toshiaki Maruichi, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 30 days.

(21) Appl. No.: 16/086,812

(22) PCT Filed: Mar. 7, 2017

(86) PCT No.: PCT/JP2017/009082
§ 371 (c)(1),
(2) Date: Nov. 8, 2018

(87) PCT Pub. No.: WO2017/163860
PCT Pub. Date: Sep. 28, 2017

(65) Prior Publication Data
US 2019/0063536 A1 Feb. 28, 2019

(30) Foreign Application Priority Data

Mar. 23, 2016 (JP) ................... 2016-059068

(51) Int. Cl.
*F16F 1/366* (2006.01)
*F16F 1/06* (2006.01)
(Continued)

(52) U.S. Cl.
CPC ............... *F16F 1/06* (2013.01); *B29C 70/06* (2013.01); *C08J 5/04* (2013.01); *F16F 1/14* (2013.01);
(Continued)

(58) Field of Classification Search
CPC .. F16F 1/3665; F16F 1/366; F16F 2224/0241; B29L 2031/7742; B29C 53/12
See application file for complete search history.

(56) References Cited

U.S. PATENT DOCUMENTS 5,004,574 A * 4/1991 Sandt ..................... B29C 53/12
264/101
5,549,370 A 8/1996 Folsom
(Continued)

FOREIGN PATENT DOCUMENTS

CN 103573892 A 2/2014
EP 2543907 A2 * 1/2013 ............. F16F 1/366
(Continued)

OTHER PUBLICATIONS

International Search Report dated Jun. 6, 2017, issued for PCT/JP2017/009082.
(Continued)

*Primary Examiner* — Bradley T King
*Assistant Examiner* — Stephen M Bowes
(74) *Attorney, Agent, or Firm* — Locke Lord LLP; James E. Armstrong, IV; Nicholas J. DiCegile, Jr.

(57) ABSTRACT

The coil spring according to the present invention is a coil spring that is formed by spirally winding a wire rod and that includes a core that is elastically deformable and a reinforced fiber layer including reinforcing fibers wound around an outer circumference of the core and a thermoset resin that firmly adheres the reinforcing fibers to one another, wherein, in at least a part of a surface layer of the reinforced fiber layer, a content percentage of the reinforcing fibers on an inner circumferential side of the coil spring is larger than a content percentage of the reinforcing fibers on an outer circumferential side of the coil spring.

6 Claims, 5 Drawing Sheets

(51) Int. Cl.
*C08J 5/04* (2006.01)
*B29C 70/06* (2006.01)
*F16F 1/14* (2006.01)
*B29K 307/04* (2006.01)
*B29L 31/00* (2006.01)

(52) U.S. Cl.
CPC ........ *F16F 1/3665* (2013.01); *B29K 2307/04* (2013.01); *B29L 2031/7742* (2013.01)

(56) References Cited

U.S. PATENT DOCUMENTS

| | | | | |
|---|---|---|---|---|
| 5,603,490 | A | * | 2/1997 | Folsom ................. F16F 1/3665 267/149 |
| 5,685,525 | A | | 11/1997 | Oguri et al. |
| 8,857,801 | B2 | | 10/2014 | Yoshioka |
| 9,677,637 | B2 | | 6/2017 | Yoshioka |
| 9,982,734 | B2 | | 5/2018 | Yoshioka |
| 2002/0190451 | A1 | * | 12/2002 | Sancaktar ............... B29C 53/12 267/166 |
| 2007/0235913 | A1 | * | 10/2007 | Chien .................. F16F 1/3605 267/149 |
| 2009/0243174 | A1 | * | 10/2009 | Spencer ................. B29C 53/12 267/169 |
| 2014/0046502 | A1 | | 2/2014 | Schmitt |
| 2015/0033838 | A1 | | 2/2015 | Chabanon et al. |
| 2018/0245651 | A1 | | 8/2018 | Yoshioka |
| 2020/0208702 | A1 | * | 7/2020 | Ono ........................ C22C 21/06 |

FOREIGN PATENT DOCUMENTS

| | | | |
|---|---|---|---|
| EP | 3343058 A1 | | 7/2018 |
| FR | 2983954 A1 | | 6/2013 |
| GB | 1419268 A | * | 12/1975 ................ F16F 3/12 |
| JP | 61-055417 A | | 3/1986 |
| JP | 07-042778 A | | 2/1995 |
| JP | 2006-226327 A | | 8/2006 |
| JP | 2015-526661 A | | 9/2015 |
| WO | 2007-122385 A2 | | 11/2007 |
| WO | 2014/014481 A1 | | 1/2014 |
| WO | 2017/034034 A1 | | 3/2017 |

OTHER PUBLICATIONS

Supplementary European Search Report dated Oct. 23, 2019, issued for the corresponding European patent application No. 17769905.5.
Office Action issued in corresponding Chinese Patent Application No. CN 201780027757,8, dated Jul. 2020.

* cited by examiner

COIL SPRING

FIELD

The present invention relates to a coil spring that is formed by spirally winding a wire rod.

BACKGROUND

Conventionally, reducing the weight of various parts has been pursued as a strategy to realize improvement in fuel efficiency of vehicles. For example, aluminum alloys are starting to be used as materials of engine blocks instead of conventionally-used cast irons and magnesium alloys are starting to be used as materials of engine covers and oil pans instead of conventionally-used steels.

In recent years, in terms of reduction of weight of vehicles, for example, reducing the weight of elastic members, such as coil springs serving as suspension springs for suspension, has been under study. As a wire rod for elastic members enabling reduction of weight of such elastic members, a wire rod for elastic members that has a fiber reinforced resin layer consisting of fibers, such as carbon fibers that are wound around a core, and resin is exemplified (see, for example, Patent Literatures 1 and 2).

Patent literature 1 discloses a coil spring in which carbon fibers are arranged with an angle of +30° to +60° or −30° to −60° with respect to a rod core, wherein a ratio A/B is represented by 1.1<A/B<4.0 where A is an amount of fibers that are arranged in a direction in which a compressive force is applied and B is an amount of fibers that are arranged in a direction in which a tensile force is applied.

Patent literature 2 discloses a composite coil spring including a coil body in which a wire rod including a core and multiple fiber layers that are layered on the outer circumference of the core and that are impregnated with a polymer material extends along an axis forming a coil shape. In the composite coil spring disclosed by Patent Literature 2, the multiple fiber layers are arranged around the core respectively at different radial distances from the axis forming the coil shape. Each fiber in the multiple fiber layers extends obliquely to the axis forming the coil shape. As for the number of fibers in each of the fiber layers, layers having different numbers of layers are contained.

CITATION LIST

Patent Literature

Patent Literature 1: Japanese Laid-open Patent Publication No. H7-42778
Patent Literature 2: Japanese National Publication of International Patent Application No. 2015-526661

SUMMARY

Technical Problem

It is known that, when a coil spring is compressed and a stress is applied to a wire rod, the stress that occurs in the cross section (horizontal section) orthogonal to the longitudinal direction of the wire rod reduces from the inner circumferential side of the coil spring to the outer circumferential side. Specifically, in the horizontal section of the coil spring, the stress applied to the inner circumferential side of the coil spring is greater than the stress applied to the outer circumferential side.

The above-described stresses applied to the inner circumferential side and the outer circumferential side of the coil spring and the strength of the wire rod are not taken into consideration for the coil springs disclosed by Patent Literatures 1 and 2 and there is a problem that, when a stress due to compression is applied, even when the the outer circumferential side with smaller stress can be dealt with for strength, a case where the strength on the inner circumferential side with a greater stress is insufficient occurs and this reduces the strength of the coil spring. Increasing the strength on the inner circumferential side to maintain the strength of the coil spring excessively increases the strength on the outer circumferential side according to the increase in strength on the inner circumferential side and it is difficult to balance the inner circumferential side and the outer circumferential side. There is also a problem that the amount of fibers has to be increased in order to increase the strength and this increases the diameter of the wire rod and thus increases the size of the coil spring.

The present invention was made in view of the above-described circumstances and an object of the present invention is to provide a coil spring enabling an increase in strength without increasing the amount of fibers.

Solution to Problem

To solve the above-described problem and achieve the object, a coil spring according to the present invention includes: a core that is elastically deformable; and a reinforced fiber layer including reinforcing fibers wound around an outer circumference of the core, and a thermoset resin that firmly adheres the reinforcing fibers to one another, wherein, in at least a part of a surface layer of the reinforced fiber layer, a content percentage of the reinforcing fibers on an inner circumferential side of the coil spring is larger than a content percentage of the reinforcing fibers on an outer circumferential side of the coil spring.

Moreover, in the above-described coil spring according to the present invention, the coil spring is formed by winding a wire rod including the core and the reinforced fiber layer, and in at least an area on the inner circumferential side in a cross section orthogonal to a center axis of the core, a content percentage of the reinforcing fibers continuously reduces from an innermost part to the outer circumferential side along a circumferential direction of the wire rod.

Moreover, in the above-described coil spring according to the present invention, the content percentage of the reinforcing fibers on the inner circumferential side in the reinforced fiber layer is 65 vol % to 85 vol %.

Moreover, in the above-described coil spring according to the present invention, $V_{fo}<V_{fi}$ holds where $V_{fi}$ (vol %) is a content percentage of the reinforcing fibers in the area on the inner circumferential side in the cross section orthogonal to the center axis of the core and $V_{fo}$ (vol %) is a content percentage of the reinforcing fibers in the area on the outer circumferential side, and a difference $V_{fi}-V_{fo}$ between $V_{fi}$ and $V_{fo}$ is 5 vol % to 25 vol %.

Moreover, in the above-described coil spring according to the present invention, a direction in which the reinforcing fibers at least on an outer surface are wound around the core is a direction along a direction of a tension load that is applied to the wire rod according to a load that is a load applied from the outside and that applies a torsional stress to the wire rod of the coil spring.

Moreover, in the above-described coil spring according to the present invention, the center axis of the core is eccentric to a center axis of the reinforced fiber layer in the cross section orthogonal to the center axis of the core.

Moreover, in the above-described coil spring according to the present invention, a spring index c=D/d, where D is an average radius of the coil spring and d is a diameter of the wire rod, is 4 to 10.

Advantageous Effects of Invention

According to the present invention, an effect that it is possible to increase the strength without increasing the amount of fibers is produced.

DESCRIPTION OF EMBODIMENTS

Modes for carrying out the present invention ("embodiments" below) will be described below with reference to the accompanying drawings. The drawings are schematic and the relation between the thickness and width of each part, a rate of the thickness of each part, etc., may be different from actual ones and parts that are different in size relation and ratio among the drawings may be contained.

Figure 1:
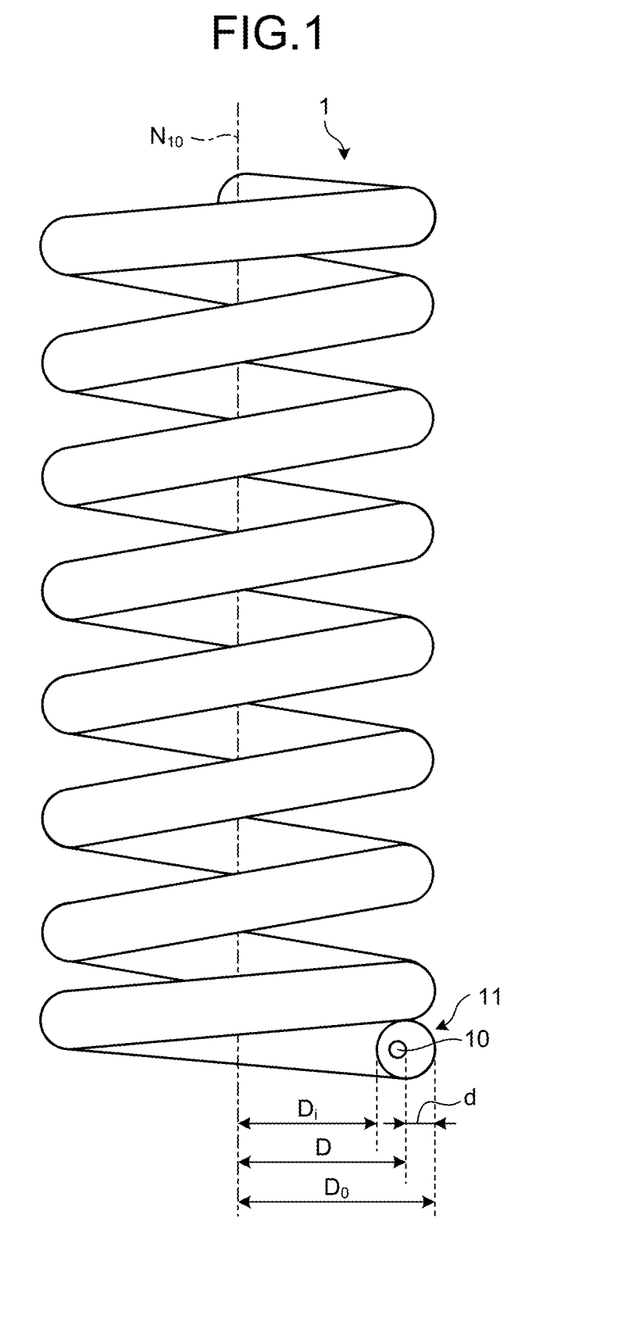
FIG. 1 is a schematic diagram illustrating a configuration of a coil spring according to an embodiment of the present invention.
Figure 2:
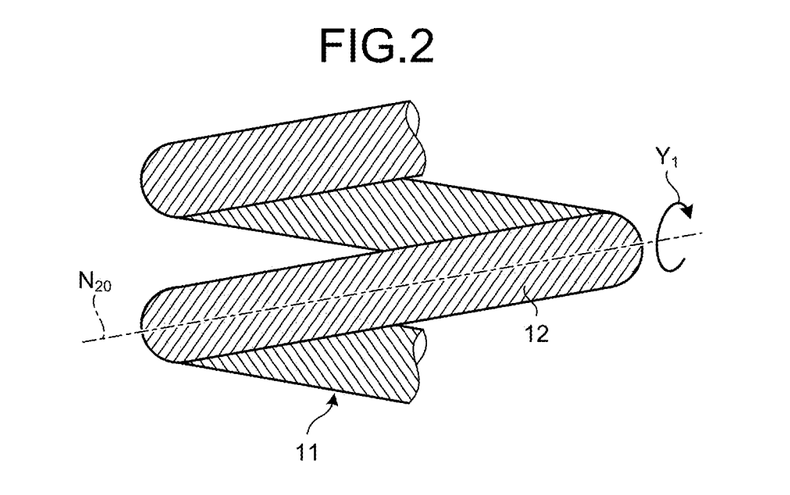
FIG. 2 is a schematic diagram illustrating a configuration of a relevant part of the coil spring according to the embodiment of the present invention.
Figure 3:
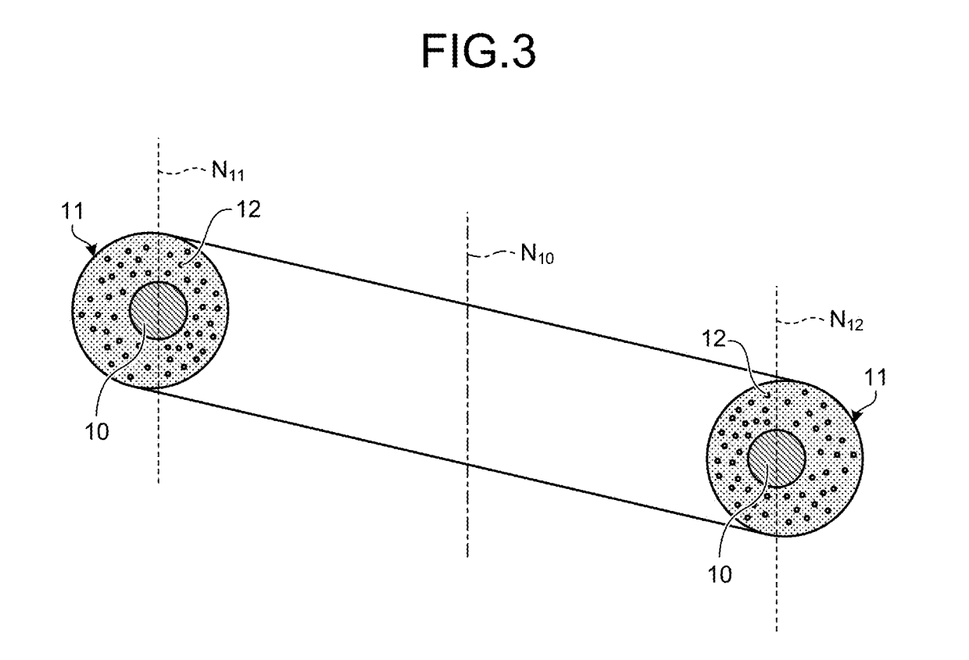
FIG. 3 is a schematic diagram illustrating the configuration of the relevant part of the coil spring according to the embodiment of the present invention.

FIG. 1 is a schematic diagram illustrating a configuration of a coil spring according to an embodiment of the present invention. FIG. 2 is a schematic diagram illustrating a configuration of a relevant part of the coil spring according to the embodiment of the present invention. FIG. 3 is a schematic diagram illustrating the configuration of the relevant part of the coil spring according to the embodiment of the present invention and is a cross-sectional view where a plane that passes through the center axis of the coil spring (the center axis of winding) and that is parallel to the center axis is a cross-section. A coil spring 1 is manufactured by spirally winding a wire rod formed by winding fibers around a core. The coil spring 1 is stretchable in a given direction (for example, the direction of the center axis of the coil spring 1). The coil spring 1 is, for example, used as a suspension spring for suspension of a vehicle.

The coil spring 1 includes a core 10 and a fiber reinforced plastics (FRP) layer 11 that is a reinforced fiber layer containing multiple fibers that are wound around the core 10 and covering the core 10 and the coil spring 1 has a spiral shape. The coil spring 1 preferably has a modulus of rigidity higher than 6 GPa and the wire rod of the coil spring 1 more preferably has a modulus of rigidity equal to or higher than 9 GPa as the strength in a case where the coil spring 1 is used as a suspension spring. The coil spring 1 is, for example, formed by winding a wire rod of φ10 mm to φ40 mm. An average diameter of the coil spring 1 that is a diameter in a direction orthogonal to a center axis $N_{10}$ of the coil spring 1 is φ60 mm to φ400 mm. An outer casing (tube) that covers the outer surface of the FRP layer 11 may be provided.

The core 10 is elastically deformable and formed from a wire rod that is formed using a material that is lighter than ferrous materials, such as cast iron, for example, a metal, such as aluminum or titanium, an alloy whose main component is aluminum, magnesium or titanium, or a resin material. The embodiment will be described as one where the cross section of the core 10 forms a circle; however, the cross section may form an oval or form a polygon. When the average diameter of the coil spring 1 is φ60 mm to φ400 mm, the diameter of the core 10 is, for example, φ5 mm to φ20 mm.

The FRP layer 11 is formed by, as illustrated in FIGS. 2 and 3, winding the multiple reinforcing fibers 12 that are impregnated with uncured thermoset resin and then heating the reinforcing fibers 12 to harden the resin or, after winding the multiple reinforcing fibers 12 around the core 10, impregnating the reinforcing fibers 12 with uncured thermoset resin and heating the reinforcing fibers 12 to harden the resin. As the reinforcing fibers 12, at least one fiber selected from carbon fiber, glass fiber, aramid fiber that is aromatic polyamide fiber and basalt fiber that is Basfiber is used. In the FRP layer 11, at least part of reinforcing fibers are firmly adhered with one another with the thermoset resin. In other words, the FRP layer 11 includes the above-described reinforcing fibers 12 and the thermoset resin that fixes the reinforcing fibers 12 to one another. As the thermoset resin, resin that is hardened by heat, for example, epoxy resin is exemplified.

As for the reinforcing fibers 12 in the FRP layer 11, the fibers may be wound around the core 10 one by one or multiple fibers are bundled and multiple bundles may be wound around the core 10. In any winding, the directions in which the fibers are wound are aligned. A sheet-like bundle of fibers may be provided on the outer surface of the core 10 with the fibers in the longitudinal direction aligned. One or multiple reinforcing fibers are wound in the radial direction of the wire rod.

It is preferable that the reinforcing fibers 12 be continuous from one end of the wire rod extending spirally to the other end to increase the strength of the coil spring 1 (the FRP layer 11). When the reinforcing fibers 12 are not continuous, the load applied from the outside cannot be borne by the whole wire rod and the stress concentrates on the discontinuous part and the part tends to be start of destroy of the wire rod. When the reinforcing fibers 12 are continuous from one end of the wire rod to the other end, the reinforcing fibers 12 extend spirally from one end of the wire rod to the other end and are continuous along the circumferential direction with respect to the core 10.

Figure 4:
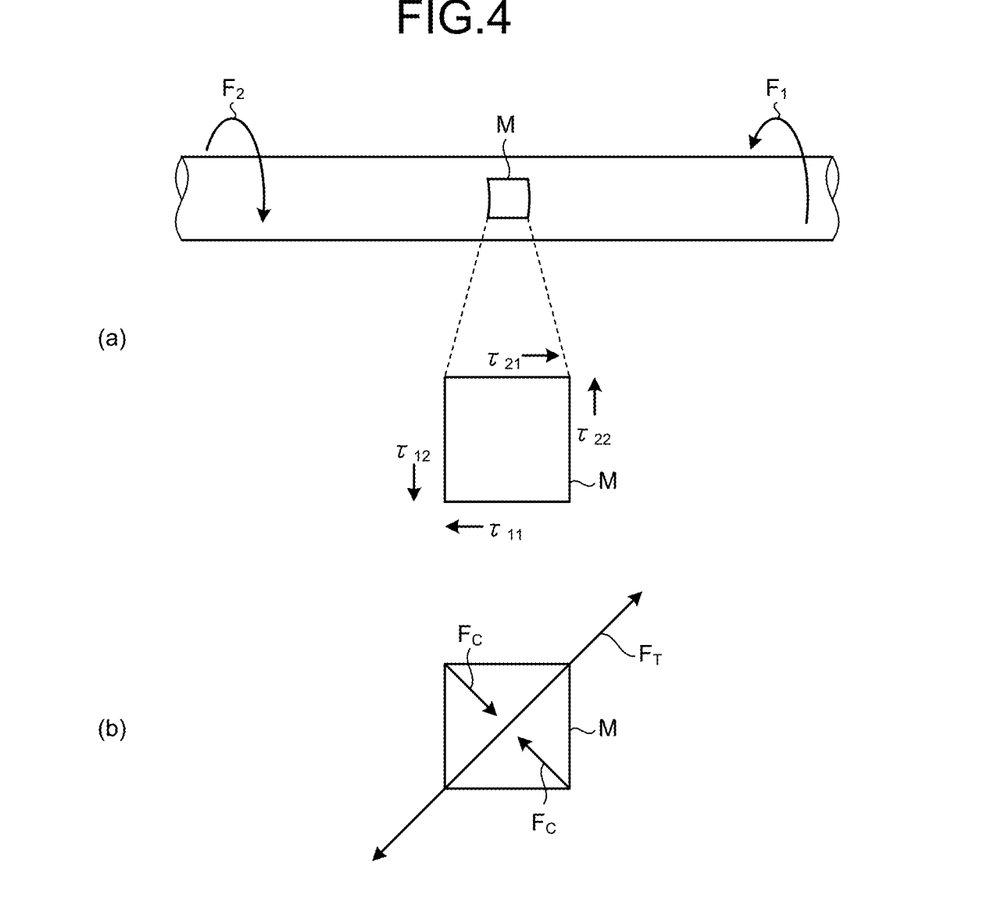
FIG. 4 is a schematic diagram illustrating the relevant part of a wire rod for coil springs according to the embodiment of the present invention.

As for the winding direction in which the reinforcing fibers 12 are wound around the core 10 (direction in which the reinforcing fibers 12 are wound: a winding direction $Y_1$ in FIG. 2), for example, the reinforcing fibers 12 are wound at an angle in a range 45°±10° with respect to a center axis $N_{20}$ of the wire rod. As for the reinforcing fibers 12, it is preferable that, when a load is applied from the outside, the winding direction $Y_1$ in which the reinforcing fibers 12 at least on the outer surface be a direction along a direction of a tension load among the tension load and the compressive load that are loads applied to the wire rod. FIG. 4 is a schematic diagram illustrating a configuration of a relevant part of the wire rod for coil springs according to the embodiment of the present invention and is a diagram illustrating the load applied to the surface of the wire rod when a torsional stress is applied to the wire rod for coil springs. When a torsional stress by loads $F_1$ and $F_2$ that are loads around the center axis of the wire rod for coil springs and that are in opposite directions is applied to the wire rod for coil springs, shear stresses $\tau_{11}$, $\tau_{12}$, $\tau_{21}$ and $\tau_{22}$ represented in (a) in FIG. 4 are applied to a rectangular fine area M on the surface of the wire rod for coil springs. Application of the shear stresses $\tau_{11}$, $\tau_{12}$, $\tau_{21}$ and $\tau_{22}$ to the wire rod is, in other words, application of a tension load $F_T$ and a compressive load $F_c$ illustrated in (b) in FIG. 4 to the fine area M. The direction in which the tension load $F_T$ is applied is at 45° with respect to the longitudinal axis (center axis $N_{20}$) of the wire rod theoretically but the angle is in a range 45°±10° in consideration of variation in the shape of the wire rod.

The direction $Y_1$ in which the reinforcing fibers 12 are wound according to the embodiment is preferably a direction along the aforementioned tension load $F_T$ and all the reinforcing fibers 12 are preferably wound along the tension load $F_T$. The angle at which the reinforcing fibers 12 are wound may differ partially; however, the reinforcing fibers 12 are preferably wound around the core 10 at a given winding angle. The "given winding angle" herein covers errors in winding angle in manufacturing.

The content percentage of the reinforcing fibers 12 according to the embodiment in an area on the inner circumferential side of the coil spring 1 in a cross section orthogonal to the center axis $N_{10}$ in the FRP layer 11 is higher than the content percentage of the reinforcing fibers 12 in an area on the outer circumferential side. The inner circumferential side herein is a side of the cross section in the FRP layer 11 close to the center axis $N_{10}$ and the outer circumferential side is a side distant from the center axis $N_{10}$. The area on the inner circumferential side and the area on the outer circumferential side are parallel to the center axis $N_{10}$ of the coil spring 1 and refer to the area on the inner circumferential side and the area on the outer circumferential side in the coil spring 1 that are obtained by dividing the coil spring 1 at the axes $N_{11}$ and $N_{12}$ passing through the center of the core 10 and serving as the boundaries. The content percentage of the reinforcing fibers 12 refers to the content percentage of the reinforcing fibers 12 in the surface layer of the coil spring 1. The surface layer, for example, refers to an area whose depth from the surface of the coil spring 1 in a direction of the radius of the wire rod is 15% or less. At least $V_{fo} < V_{fi}$ holds, where $V_{fi}$ is a content percentage of the reinforcing fibers 12 in the area on the inner circumferential side and $V_{fo}$ is a content percentage of the reinforcing fibers 12 in the area on the outer circumferential side. In order to further increase the strength of the coil spring 1, $V_{fi}$ is preferably between 65 vol % and 85 vol % inclusive and more preferably 70 vol % or higher. Furthermore, as for $V_{fi}$ and $V_{fo}$, a difference ($V_{fi}-V_{fo}$) between the two content percentages is preferably between 5 vol % and 25 vol % inclusive. The content percentage of the reinforcing fibers 12 varies depending on the amount of the impregnated thermoset resin. In the coil spring 1, the number of the reinforcing fibers 12 is approximately the same between the area on the inner circumferential side and the area on the outer circumferential side, and the above-described content percentage of the reinforcing fibers 12 depends on the content percentage of the thermoset resin contained in each of the areas and the amount of air bubbles.

Each of the content percentages of the reinforcing fibers 12 in the area on the outer circumferential side and the area on the outer circumferential side is an average (vol %) of the content percentages at given multiple points in each of the areas and the average in the area on the inner circumferential side is larger than the average in the area on the outer circumferential side. As the stress applied to the wire rod reduces from the inner circumferential side to the outer circumferential side, the content percentage of the reinforcing fibers 12 may continuously decrease from the inner circumferential side to the outer circumferential side.

In the coil spring 1, the content percentage of the reinforcing fibers 12 in the FRP layer 11 meets the above-described condition and the center of the core 10 and the center of the FRP layer 11 are eccentric. In the embodiment, the center of the core 10 is arranged beside the inner circumferential side of the coil spring 1.

As described above, it is known that, when the coil spring 1 is compressed and a stress is applied to the wire rod, the stress occurring in the cross section (horizontal section) orthogonal to the longitudinal direction of the wire rod reduces continuously from the inner circumferential side to the outer circumferential side. Specifically, in the horizontal surface of the coil spring, the stress applied to the inner circumferential side of the coil spring is larger than the stress applied to the outer circumferential side. For this reason, the strength on the inner circumferential side is more important than the strength on the outer circumferential side to the stress to the coil spring 1. A higher content percentage of the reinforcing fibers 12 on the inner circumferential side than the content percentage of the reinforcing fibers 12 on the outer circumferential side as in the embodiment increases the strength on the inner circumferential side and thus increases the strength of the coil spring 1 to stresses. The stress herein, for example, refers to the net force of the torsional stress and the shear stress.

The spring constant of the coil spring 1 (compressive coil spring) and calculation of a stress will be described below. In general, the relation of the following Equation (1) holds for a spring constant k of the coil spring 1. Use of the following Equation (1) enables calculation of a modulus of rigidity from the spring constant k.

$$k=P/\delta=Gd^4/8nD^3 \qquad (1)$$

where P is a load (N), $\delta$ is a deflection (mm), G is a modulus of rigidity (GPa), d is a diameter of the wire rod forming the coil spring 1, n is an effective number of windings, and D is an average radius of the coil spring 1. As illustrated in FIG. 1, for the average radius of the coil spring 1, $D=(D_i+D_o)/2$ holds where $D_i$ is an inner radius of the coil spring 1 and $D_o$ is an outer radius of the coil spring 1.

The following Equation (2) holds for a torsional stress $\tau_0$. A maximum stress $\tau_{max}$ and a minimum stress $\tau_{min}$ can be derived from the following Equations (3) and (4) where $\kappa_i$ is a stress correction coefficient of whorls that is calculated from a spring index that is a stress correction coefficient of whorls on the inner circumferential side of the coil spring and $\kappa_o$ is a stress correction coefficient of whorls on the outer circumferential side of the coil spring. The relations of the Equations (5) and (6) hold for the stress correction coefficients $\kappa_i$ and $\kappa_o$. The following Equations (3) and (4) are equations representing that stresses applied to the area on the inner circumferential side and the area on the outer circumferential side are different from each other and the stress is maximized in the area on the inner circumferential side.

$$\tau_0 = 8PD/\pi d^3 \quad (2)$$

$$\tau_{max} = \kappa_i \tau_0 \quad (3)$$

$$\tau_{min} = \kappa_o \tau_0 \quad (4)$$

$$\kappa_i = (4c-1)/(4c-4) + 0.615/c \quad (5)$$

$$\kappa_o = (4c-1)/(4c+4) - 0.615/c \quad (6)$$

where c is a spring index, and c=D/d holds.

The maximum stress $\tau_{max}$ corresponds to a stress applied to the innermost part of the coil spring and the minimum stress $\tau_{min}$ corresponds to a stress applied to the outermost part of the coil spring. The aforementioned modulus of rigidity G is calculated by dividing the torsional stress $\tau_0$ multiplied by the spring constant k by a strain σ ($k\tau_0/\sigma$). The innermost part refers to a part positioned on the innermost side of the coil spring 1 in the FRP layer 11 and the outermost part refers to a part positioned on the outermost side of the coil spring 1 in the FRP layer 11.

In the coil spring 1 according to the embodiment, the spring index c (=D/d) meets a range from 4 to 15 inclusive and more preferably meets a range from 4 to 10 inclusive. Meeting the condition causes the effect of the shear stress to be smaller than that of the torsional moment due to the torsional stress. When the spring index c is small, that is, the curvature is large, the difference in stress between the area on the inner circumferential side and the area on the outer circumferential side increases. The coil spring 1 according to the embodiment is effective particularly in the case where the stress difference is large as described above.

Figure 5:
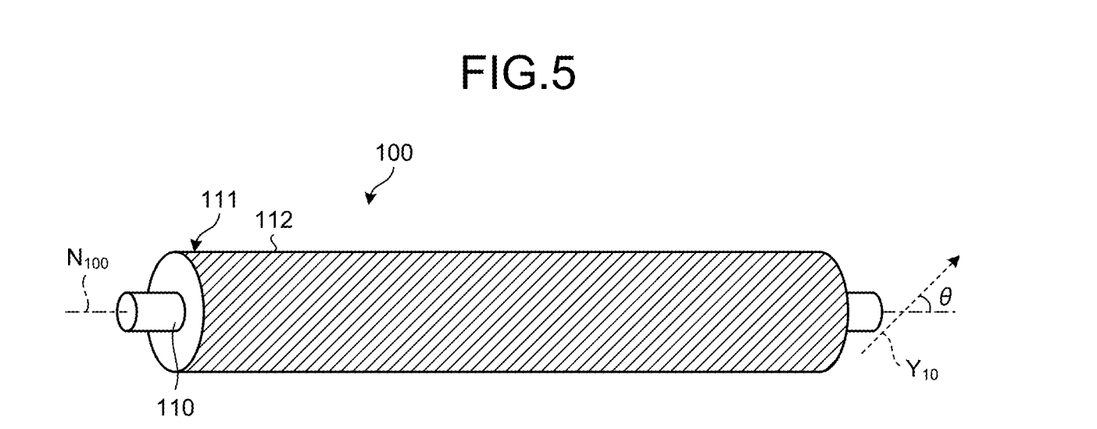
FIG. 5 is a plane view illustrating a configuration of a wire rod for elastic members for manufacturing the coil spring according to the embodiment of the present invention.

FIG. 5 is a plane view illustrating a configuration of the wire rod for elastic members that is a wire rod for manufacturing the coil spring 1. The wire rod 100 for elastic members illustrated in FIG. 5 (simply referred to as "wire rod 100" below) forms a cylindrical shape of a layer structure including a cylindrical core 110 that is made of the same material as that of the core 10 and an FRP layer 111 that is formed by winding reinforcing fibers 112 consisting of the same fibers as the reinforcing fibers 12 around the outer circumference of the core 110. The reinforcing fibers 112 that are wound around the core 110 may be impregnated with a liquid thermoset resin in advance or may be impregnated with a thermoset resin after being wound around the core 110.

A method of manufacturing the wire rod 100 will be described. First of all, a wire rod obtained by winding the reinforcing fibers 112 that is impregnated with a liquid thermoset resin in advance around the core 110 is obtained. A winding direction $Y_{10}$ in which the reinforcing fibers 112 are wound around the core 110 (direction in which the reinforcing fibers 112 extend) is, for example, along the direction of the above-described tension load when it is assumed that a load is applied from the outside to the coil spring 1 that is manufactured by spirally winding the wire rod 100. Specifically, as for the winding direction $Y_{10}$ in which the reinforcing fibers 112 are wound around the core 110, when viewed from the direction orthogonal to the longitudinal axis of the core 110 (for example, the axis $N_{100}$ represented in FIG. 5), an angle θ formed by the winding direction $Y_{10}$ (direction in which the reinforcing fibers 112 extend) and the axis $N_{100}$ is an angle within a range 40°<θ≤50°. As the method of winding the reinforcing fibers 112 around the core 110, filament winding is exemplified. Use of a reinforcing fiber bundle where multiple reinforcing fibers form a sheet-like shape enables formation by sheet winding.

Figure 6:
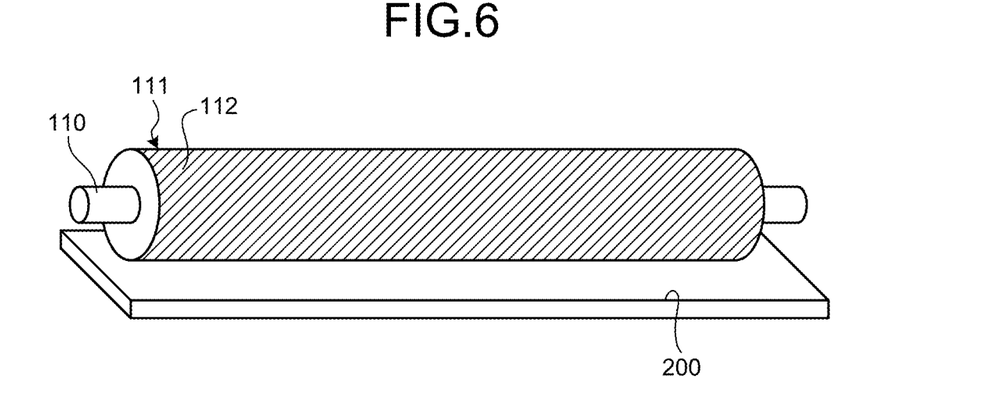
FIG. 6 is a diagram illustrating a method of manufacturing the wire rod for elastic members according to the embodiment of the present invention.

FIG. 6 is a diagram illustrating a method of manufacturing a wire rod for elastic members according to the embodiment of the present invention. After the reinforcing fibers 112 are wound around the core 110, a plate member 200 is pushed against the wire rod from the radial direction of the core 110 to move the thermoset resin to a side opposite to the plate member 200 and increase the content percentage of the reinforcing fibers 112 in the FRP layer 111 on the side of the plate member 200 with respect to the core 110. Accordingly, it is possible to obtain the above-described wire rod in which the content percentages of the reinforcing fibers 112 on one side and the other side in the radial direction of the wire rod are different from each other. In order increase the following operability, the wire rod obtained by covering the resultant wire rod with a heat shrinkable tube and heating the heat shrinkable tube to cause the tube to shrink may serve as the wire rod for manufacturing the coil spring 1.

A curved surface having a curvature radius larger than the curvature radius of the surface of the wire rod may be formed on the surface of the plate member 200 against which the wire rod is pushed and the wire rod may be pushed against the curved surface. This makes it possible to prevent the position of the wire rod with respect to the plate member 200 from shifting and push the the plate member 200 against the wire rod in plane contact.

As described above, the modulus of rigidity of the wire rod 100 is preferably equal to or higher than 9 GPa as the strength in the case where the wire rod 100 is used as the wire rod for suspension springs.

It is possible to manufacture the above-described coil spring 1 by spirally winding the wire rod 100 before thermal curing such that the area having a higher content percentage of fibers is arranged on the inner circumferential side of the coil spring and then hardening the thermoset resin by heat.

The above-described method of manufacturing a wire rod has been described as one in which the content percentage of reinforcing fibers is changed by pushing the wire rod against the plate member 200 and, alternatively, it is possible to obtain the coil spring 1 having different content percentages of the reinforcing fibers 112 by, during coiling of the wire rod to manufacture the coil spring 1, winding the wire rod with the fiber reinforced plastics (FRP) layer 111 being pushed against the core 110. For example, when manufacturing the coil spring 1 by winding the wire rod with a lead screw, in the above-described method of manufacturing a wire rod, using a wire rod in which the content percentages of the reinforcing 112 in the area on the inner circumferential side and the area on the outer circumferential side before pressing of the plate member 200 are approximately equal to each other and winding the wire rod while pushing the wire rod toward the center direction of the screw make it possible to obtain the coil spring 1 with different content percentages of the reinforcing fibers 112.

In the coil spring 1 according to the present invention, the relation of the content percentages of the reinforcing fibers 12 according to the present invention may be used over the coil spring 1. The relation of the content percentages of the reinforcing fibers 12 according to the present invention may be limited to only a part where a large load is applied during compression, for example, the area on the inner circumferential side of the coil spring 1. In this case, in the area on the circumferential side of the coil spring 1, the content percentage of the reinforcing fibers 12 continuously reduces along the circumferential direction of the wire rod from the innermost part to the outer circumferential side.

According to the embodiment of the present invention, the coil spring 1 includes the core 10 that is elastically deformable and the FRP layer 11 that consists of the reinforcing fibers 12 that are wound around the core 10 and the thermoset resin that firmly adheres the reinforcing fibers and that covers the outer surface of the core 10 and, as the content percentage of the reinforcing fibers 12 in the FRP layer 11 on the inner circumferential side is higher than the content percentage of the reinforcing fibers 12 on the outer circumferential side, it is possible to increase the strength on the inner circumferential side to which the stress is relatively greatly applied to increase the strength including resistance to the stress without increasing the amount of fibers.

According to the embodiment of the present invention, it is possible to increase the strength without increasing the amount of fibers and thus to reduce the costs of manufacturing coil springs.

EXAMPLE

Examples of the coil spring according to the present invention will be described. The present invention is not limited to the examples. First of all, configurations of wire rods for elastic members according to the examples will be described.

Example 1

A baculiform polypropylene (PP) resin material with φ7 mm was used as a core and tow prepregs that are a carbon fiber bundles containing 40 vol % of a mixture containing epoxy resin that is a thermoset resin and a cross linker was used as reinforcing fibers.

For a wire rod for elastic members, the tow prepregs were wound around the core. First of all, the carbon fiber bundles were wound at 45° with respect to the longitudinal axis of the core when viewed from a direction orthogonal to the longitudinal axis of the core. Thereafter, the resultant wire rod was covered with a heat shrinkable tube and the heat shrinkable tube was caused to shrink by heat and used as the wire rod for manufacturing coil springs. The wire rod for manufacturing coil springs was wound around a lead screw that is a coil spring mold with application of a tension of 100 N being applied to the lead screw to be fixed (coiling) and the epoxy resin was hardened by heat so that the coil spring according to Example 1 was obtained.

Example 2

A coil spring of Example 2 was obtained in the same manner as that of Example 1 except that the tension during coiling of a wire rod for manufacturing coil springs is equal to or smaller than 5 N.

Example 3

A coil spring of Example 3 was obtained in the same manner as that of Example 1 except that a mixture contained in carbon fiber bundles was 47 vol % and a tension during coiling of a wire rod for manufacturing coil springs was 20 N.

In the above-described Examples 1 to 3, the diameters of the cores and the outer diameters of the wire rods before molding are aligned.

The content of tests according to Examples will be described.

(Fiber Volume Content Percentage)

Figure 7:
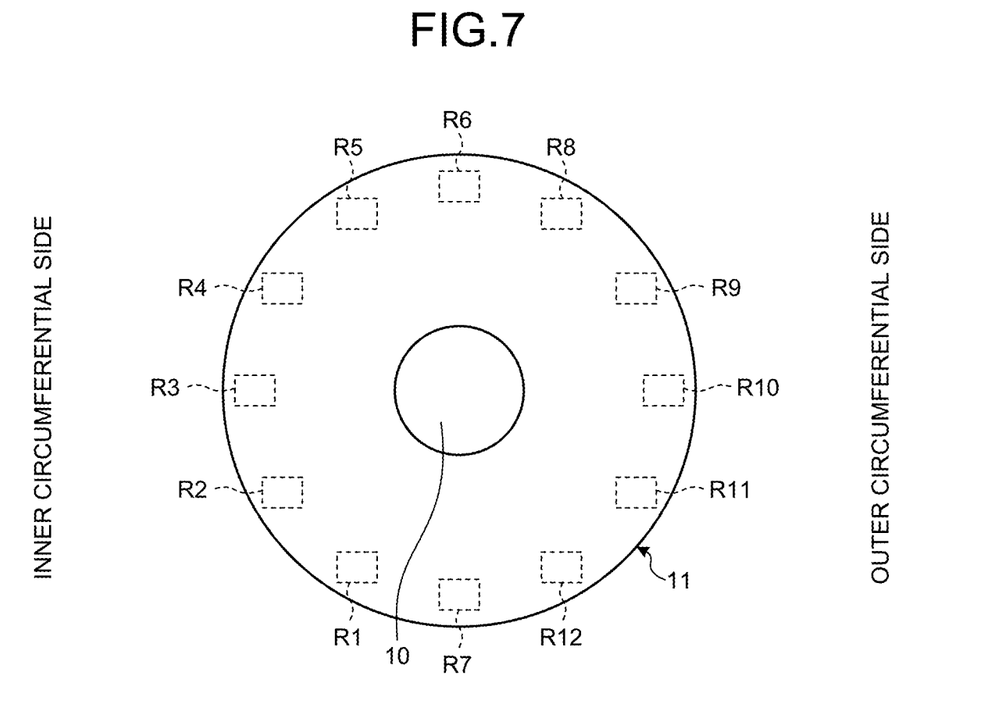
FIG. 7 is a diagram illustrating a method of measuring a content percentage of reinforcing fibers of a coil spring according to an example of the present invention.

Fiber volume content percentages were measured by acquiring images by capturing cross sections of wire rods of coil springs with a microscope with a magnification of ×300 and performing image processing on the acquired images. The images were captured in a depth from the surface in a range of 15% with respect to the diameter of the wire rod. As specific image processing, the reinforcing fibers and the thermoset resin in the images were recognized by the difference in color, the areas of the respective recognized areas were calculated and the fiber volume content percentages were calculated based on the calculated areas of the respective areas. FIG. 7 is a diagram illustrating a method of measuring a content percentage of reinforcing fibers of a coil spring according to the examples of the invention. When the cross-sectional image of the core 10 and the FRP layer 11 illustrated in FIG. 7 was obtained, multiple calculation areas R1 to R12 were set on an outer circumferential side of the FRP layer 11 in the cross-sectional image and an average was calculated from the content percentages of reinforcing fibers in the respective calculation areas R1 to R12. In the examples, in FIG. 7, the calculation area R3 was the innermost part, the calculation area R10 was the outermost part, the calculation areas R1 to R5 were areas whose content percentages of reinforcing fibers on the inner circumferential side were calculated, the calculation areas R8 to R12 were areas whose content percentages of reinforcing fibers on the outer circumferential side were calculated, and averaged in the respective areas were calculated as content percentages of reinforcing fibers in the area on the inner circumferential side and the area on the outer circumferential side.

(Static Compression Test)

Compression tests were performed at a test speed of 50 mm/min. The compression was performed until the load reached 8650 N and the displacements during the compression were measured.

(Modulus of Rigidity)

Moduli of rigidity G were calculated from Equation (1) based on the obliqueness of the load-deflection diagrams (spring constants) that were obtained by the aforementioned compression tests.

The fiber volume content percentages $V_f$, content percentage differences $V_{fi}-V_{fo}$ each between the inner circumferential side and the outer circumferential side and results of compression tests (moduli of rigidity) are represented in Table 1. A fiber volume content percentage represents a volume content percentage of reinforcing fibers in an FRP layer.

TABLE 1

| | | Fiber Volume content percentage $V_f$ (vol %) | | Content | |
|---|---|---|---|---|---|
| | Tension (N) | Inner Circumferential Side $V_{fi}$ | Outer Circumferential Side $V_{fo}$ | Percentage Difference $V_{fi} - V_{fo}$ (vol %) | Modulus of Rigidity (GPa) |
| Example 1 | 100 | 71 | 59 | 12 | 10.1 |
| Example 2 | 5 | 62 | 58 | 4 | 7.7 |
| Example 3 | 20 | 59 | 47 | 11 | 6.9 |

In all Examples 1 to 3, a result representing that the fiber content percentage in the inner circumferential area is higher than that in the outer circumferential area and the modulus of rigidity is higher than 6 GPa was obtained. When Example 1 and Example 2 are compared to each other, Example 1 is larger in both content percentage difference and modulus of rigidity and Example 1 has a higher modulus of rigidity and a higher strength than those of a coil spring like that of Example 2 where the difference between the content percentages of reinforcing fibers in the area on the inner circumferential side and the area on the outer circumferential side is small. Example 1 with a larger content percentage difference than that in Example 2 will be compared to Example 3. The content percentage differences in First Example and Third Example are approximately equal to each other but Example 1 has a higher modulus of rigidity and thus Example 1 has a higher strength of coil spring. As described above, it is understood that a coil spring with a higher content percentage difference and a higher fiber volume content percentage has higher strength as a coil spring.

The tension during coiling causes the resin to be squeezed out of a wire rod before being hardened by heat. Thus, the amount of resin is not necessarily the same before and after hardening. The amount of resin that is squeezed out in Example 1 is larger than those in Examples 2 and 3 and thus the whole content percentage of fibers increases, which contributes to an increase in modulus of rigidity.

When the above-described coil spring 1 is used as a suspension sprig for suspension, a wire rod for elastic members for manufacturing the coil spring 1 desirably has a modulus of rigidity of 9 Gpa or larger. According to the results of Examples, the coil spring according to Example 1 sufficiently meets a demand for a coil spring for suspension.

Figure 8:
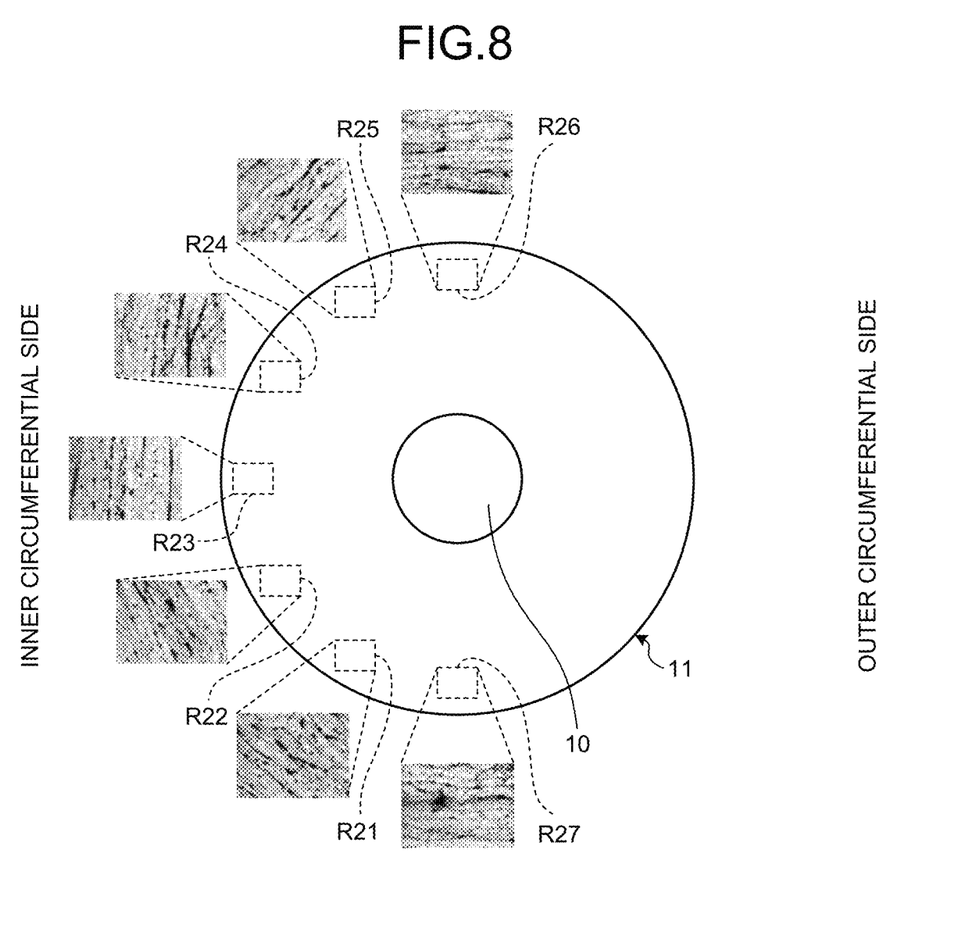
FIG. 8 is a diagram illustrating a cross section of a coil spring of Example 1 according to examples of the present invention.

Observation was performed on a cross section of the wire rod of the coil spring of Example 1. FIG. 8 is a diagram illustrating a cross-sectional image of the coil spring of Example 1 according to the examples of the present invention. In FIG. 8, parts represented in white corresponds to reinforcing fibers and parts represented in black consist of the thermoset resin and a small amount of air bubbles. When part of a cross section of the coil spring was extracted, magnified and observed (see FIG. 8), it was understood that, as represented in Table 2, in the area on the inner circumferential side of the coil spring, the fiber content percentage continuously reduces along the circumferential direction of the wire rod from the calculation area (R23) of the innermost part to the calculation areas on the outer circumferential side (R26 and R27).

TABLE 2

| Calculation Area | Content Percentage of Fibers (vol %) |
|---|---|
| R21 | 74.5 |
| R22 | 74.7 |
| R23 | 76.7 |
| R24 | 75.9 |
| R25 | 74.3 |
| R26 | 73.2 |
| R27 | 72.5 |

The present invention can include various embodiments that are not described herein, etc., and it is possible to make various design changes, etc., within a scope without departing from a technical idea that is specified by the claims.

INDUSTRIAL APPLICABILITY

As described above, a coil spring according to the present invention is preferable in increasing the strength while reducing the weight.

REFERENCE SIGNS LIST

1 COIL SPRING
10, 110 CORE
11, 111 FIBER REINFORCED PLASTICS (FRP) LAYER
12, 112 REINFORCING FIBERS
100 WIRE ROD FOR ELASTIC MEMBERS

The invention claimed is:

1. A coil spring comprising:
a wire rod comprising:
a core that is elastically deformable and has a center axis; and
a reinforced fiber layer including
reinforcing fibers wound around an outer circumference of the core, and
a thermoset resin that firmly adheres the reinforcing fibers to one another,
wherein the coil spring is formed by winding the wire rod to form a spring having an inner circumferential side and an outer circumferential side around a center axis,
wherein, in at least a part of a surface layer of the reinforced fiber layer, a content percentage of the reinforcing fibers on an inner circumferential side of the coil spring is larger than a content percentage of the reinforcing fibers on an outer circumferential side of the coil spring,
and wherein, in a cross section of the wire rod which is orthogonal to the center axis of the core and in a plane with the center axis of the coil spring, a content percentage of the reinforcing fibers on the wire rod continuously reduces from a point closes to the center axis of the coil spring to a point furthest from the center axis of the coil spring as measured along a circumferential direction of the wire rod.

2. The coil spring according to claim 1, wherein the content percentage of the reinforcing fibers on the inner circumferential side of the coil spring in the reinforced fiber layer is 65 vol % to 85 vol %.

3. The coil spring according to claim 1, wherein $V_{fo} < V_{fi}$ holds
where $V_{fi}$ (vol %) is a content percentage of the reinforcing fibers in the area on the inner circumferential side of the coil spring in the cross section orthogonal to the center axis of the core and in a plane with the center axis of the coil spring, and
$V_{fo}$ (vol %) is a content percentage of the reinforcing fibers in the area on the outer circumferential side of the coil spring in the cross section orthogonal to the center axis of the core and in a plane with the center axis of the coil spring, and
a difference $V_{fi} - V_{fo}$, between $V_{fi}$ and $V_{fo}$ is 5 vol % to 25 vol %.

4. The coil spring according to claim 1, wherein a direction in which the reinforcing fibers are wound around the core is in a range of 45°±10° with respect to the longitudinal axis of the wire rod.

5. The coil spring according to claim 1, wherein the center axis of the core is eccentric to a center axis of the reinforced fiber layer in the cross section orthogonal to the center axis of the core.

6. The coil spring according to claim 1, wherein a spring index c=D/d, where D is an average radius of the coil spring and d is a diameter of the wire rod, is 4 to 10.

* * * * *